US010217142B1

(12) United States Patent
Chordia

(10) Patent No.: US 10,217,142 B1
(45) Date of Patent: Feb. 26, 2019

(54) SELECTIVE SOLICITATION OF USER FEEDBACK FOR DIGITAL GOODS MARKETS

(75) Inventor: Ashish Chordia, Sunnyvale, CA (US)

(73) Assignee: TRIBAL TECHNOLOGIES, INC., San Mateo, CA (US)

(\*) Notice: Subject to any disclaimer, the term of this patent is extended or adjusted under 35 U.S.C. 154(b) by 0 days.

(21) Appl. No.: 13/244,213

(22) Filed: Sep. 23, 2011

Related U.S. Application Data

(60) Provisional application No. 61/385,943, filed on Sep. 23, 2010.

(51) Int. Cl.
*G06Q 30/02* (2012.01)
*G06Q 30/06* (2012.01)

(52) U.S. Cl.
CPC .............................. *G06Q 30/0282* (2013.01)

(58) Field of Classification Search
CPC ........ G06Q 10/00; G06Q 10/10; G06Q 30/02; G06Q 30/00
See application file for complete search history.

(56) References Cited

U.S. PATENT DOCUMENTS

| | | | |
|---|---|---|---|
| 6,578,199 B1 * | 6/2003 | Tsou et al. ..................... 717/178 |
| 8,145,678 B2 * | 3/2012 | Ramsay, Jr. ........... G06Q 10/10 707/802 |
| 8,214,253 B1 * | 7/2012 | Harris ................ G06Q 30/0201 455/3.04 |
| 2002/0184041 A1 * | 12/2002 | Muller .............................. 705/1 |
| 2005/0166065 A1 * | 7/2005 | Eytchison et al. ............ 713/189 |
| 2006/0106875 A1 * | 5/2006 | Terakawa ............... G06Q 30/02 |
| 2007/0282670 A1 * | 12/2007 | Repasi et al. ................... 705/10 |
| 2008/0313617 A1 * | 12/2008 | Zhu ........................ G06F 11/321 717/127 |
| 2009/0164624 A1 * | 6/2009 | Metcalf ............. G06F 17/30861 709/224 |
| 2010/0228631 A1 * | 9/2010 | Zhang ................ G06Q 30/0269 705/14.66 |
| 2010/0268574 A1 * | 10/2010 | Butcher ................. G06Q 10/10 705/14.53 |
| 2010/0318611 A1 * | 12/2010 | Curtin et al. ................. 709/206 |
| 2011/0010349 A1 * | 1/2011 | Ellingson ............... G06Q 10/00 707/695 |

\* cited by examiner

*Primary Examiner* — Kira Nguyen
(74) *Attorney, Agent, or Firm* — Womble Bond Dickinson (US) LLP

(57) ABSTRACT

Selection bias in providing user reviews for digital goods markets is compensated for by identifying users likely to provide positive reviews and actively soliciting reviews from these users. User activity data with respect to a digital good is gathered and used to identify enthusiast reviewers. Enthusiast users within the set of users are identified based on a comparison of user activity data with at least one criterion. Review solicitations are generated and provided to enthusiast users. Review solicitations are then sent to the identified users to encourage them to submit reviews for digital goods.

10 Claims, 2 Drawing Sheets

SELECTIVE SOLICITATION OF USER FEEDBACK FOR DIGITAL GOODS MARKETS

BACKGROUND OF THE INVENTION

The invention relates to the field of markets for digital goods and systems and methods for eliciting user feedback about digital goods provided by these markets. Digital goods include software applications; music, movies, books or other information or entertainment content in digital form; and virtual items in game applications. Digital goods are available for a wide variety of digital devices, including desktop, portable, and tablet computers; video game consoles; set-top boxes adapted to present digital content on a television or computer monitor; mobile phones and smartphones; and e-book reader devices. Digital goods may be purchased, rented, licensed, or obtained at no cost from a digital goods market. Once acquired, a digital good may be downloaded to a user's device via a wired or wireless network connection or through a data connection with another digital device. Digital goods may be stored in non-volatile memory in a digital device, such as on a hard disk or in flash memory, or provided to the digital device on demand from a digital goods provider or intermediary.

Digital goods markets present users with a wide variety of digital goods. Because of this, it is often difficult for users to find digital goods that meet their needs and are of good quality. To assist users, digital goods markets may provide recommendations; measures of digital goods' popularity, such as sales rankings; and reviews of digital goods from other users.

One problem with user reviews is selection bias. Although many digital goods markets allow any user of a digital good (or any user in general) to provide a review of a digital good, the users that provide reviews may not be a representative sample of all of the users of that digital good. This can be due to one or more factors, including the user interfaces provided by the digital goods market for collecting user reviews. For example, a device may ask a user to rate or review a downloaded application when the user deletes the application from the device. However, the users that delete the application are more likely to be dissatisfied with the application. In contrast, users that are satisfied with the application may have to go out of their way to provide a positive review, such logging into a separate web site. Another example of selection bias results if dissatisfied users are more motivated than satisfied users of a digital good.

BRIEF SUMMARY OF THE INVENTION

An embodiment of the invention compensates for selection bias in providing user reviews by identifying users likely to provide positive reviews and actively soliciting reviews from these users. In an embodiment, user activity data with respect to a digital good is gathered. Enthusiast users within the set of users are identified based on a comparison of user activity data with at least one criterion. Review solicitations are generated and provided to enthusiast users.

BRIEF DESCRIPTION OF THE DRAWINGS

The invention will be described with reference to the drawings, in which.

DETAILED DESCRIPTION

Figure 1:
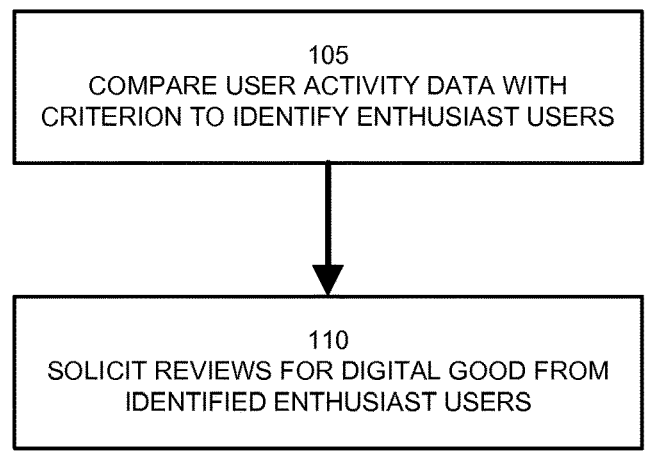
FIG. 1 illustrates a method according to an embodiment of the invention.

FIG. 1 illustrates a method 100 according to an embodiment of the invention. Method 100 compensates for selection bias in providing user reviews by identifying users likely to provide positive reviews and actively soliciting reviews from these users. In an embodiment, user activity data with respect to a digital good is gathered. Examples of user activity data include frequency of use or aggregate number of uses of a digital good; recency of use of the digital good; the duration of use of the digital good, measured on per-use, average duration, or aggregate duration; the level of engagement of the user with the digital good, measured by access to specific features or content of the digital good; and external actions indicative of appreciation of the digital good, such as sharing a digital good or a reference to the digital using a social networking service, via e-mail, or another communications system.

In step 105, user activity data for a user with respect to a digital good is compared with one or more criterion to estimate the user's quantitative or qualitative level of appreciation for the digital good. In an embodiment, if one or more types of user activity data exceed threshold values, the user is selected as an enthusiast user. In another embodiment, a user is selected as an enthusiast user based on the presence or absence of one or more types of user activity data. In yet another embodiment, two or more types of user activity data may be quantified and combined to determine an aggregate quantitative level of appreciation for the digital good. If the aggregate quantitative level of appreciation exceeds a threshold, then the user is selected as an enthusiast user. In still another embodiment, user activity data for two or more users is compared to select one or more enthusiast users. For example, users ranked in the 90th percentile or above for one or more categories of user activity data may be selected as enthusiast users.

In step 110, an embodiment of the invention solicits user reviews from the selected enthusiast users. For example, a solicitation for a user review may be presented to a selected enthusiast user within the digital good itself, such as within a software application. In another example, the solicitation for a user review may be presented to a selected enthusiast user via external means, such as an e-mail message.

In a further embodiment, the solicitation for the user review includes a user interface for receiving a user review from the user. The received user review may then be communicated to the provider of the digital good, the digital goods market, and/or a third-party, such as a content provider, digital goods marketing provider, and/or an advertising service provider.

Embodiments of the invention are implemented using a client-server architecture. In one implementation, one or more dynamically or statically integrated application components ("client components") are interfaced with digital goods and/or with an application supporting or providing access to digital goods. Client components can transmit to one or more server components user activity data (time of usage, length of usage, location of usage, usage of particular features, patterns of feature usages, etc) and demographic information; obtain scoring on a user's sentiment toward and proficiency with the application; and prompt the user for application ratings, reviews, and/or feedback based on the scoring (for example if the user is an enthusiastic user). Characteristics of client component can be programmatically configured by the application; these characteristics include its visual and interaction style, the content of the user prompts, the timing of the prompts (whether these occur only during certain times of the day, immediately, and/or upon invoking a particular feature or navigation item). After prompting a user for a rating, review, or feedback, the client component or an associated digital good or supporting application, transmits the result to a server component, and/or redirects to another website or application (e.g, a digital goods marketplace), where the user can continue to perform actions related to rating, reviewing, or providing feedback on the application.

Server components, and their APIs, invocation protocols, and data formats, that provide interfaces used by client components and associated digital goods and supporting applications to accomplish items described above. For example, the server components may include:

Logger server component: provides interface for application to log the users activity data and demographic information;

User Analyzer server component: provides scoring on user's estimated sentiment toward and proficiency with the application;

User Feedback Handler server component: provides interface to collect the user's ratings, reviews, and/or feedback.

In an embodiment, the user feedback handler component forwards user feedback to the appropriate places, such as review sections of digital goods marketplaces, third-party digital goods review websites or applications, and/or private developer-accessible forums or databases.

In an embodiment, the User Analyzer server component estimates and scores each user's sentiment toward and proficiency with applications, using algorithms and/or criteria developed or specified by the system provider, a digital goods provider or publisher, and/or the digital goods marketplace. The algorithms and criteria factor in and analyze users' individual and/or "relative to aggregate" 1) usage characteristics of the applications, 2) demographic information, 3) and history and quality of previous ratings, reviews, and/or feedback.

For example, an algorithm may highly weigh "individual user usage characteristics" such as "the user uses the app at least 3 times per week, and the average usage session lasts 5 minutes." In another example, an algorithm may highly weigh "'relative to aggregate' user usage characteristics" such as 1) "this user is ranked in the top 10% with respect to usage frequency among all users" and 2) "relative to other users, this user uses feature X 20% more often."

Embodiments of the invention may be implemented with a system architecture including computers, including portable and desktop personal computers, tablet computer, mobile phones, and smart phones. Embodiments of the system can be accessed by users, marketers, and other administrative users via any type of electronic device capable of displaying and navigating web pages or other types of electronic documents. Any number of computers can be supported.

Application server operates one or more data applications. The data applications can be implemented as one or more scripts or programs written in any programming language, such as Java, C, C++, C#, or any scripting language, such as JavaScript or ECMAScript, Perl, PHP, Python, Ruby, or TCL. Data applications can be built using libraries or application frameworks, such as Rails or .NET.

The data applications on application server process input data and requests from users, marketers, and administrators, and can store or retrieve data from database. Database stores data created and used by the data applications. In an embodiment, the database is a relational database, such as MySQL, that is adapted to store, update, and retrieve data in response to SQL format commands.

In an embodiment, the application server is one or more general purpose computers capable of executing programs or scripts. In an embodiment, the web server is implemented as an application running on one or more general purpose computers. The web server and application server may be combined and executed on the same computers. Alternatively, the functions of the web server and application server may be each be implemented by several computers operating in parallel to support large numbers of users and substantial network traffic.

An embodiment of the system architecture may also provide syndicated content using the web server or application server, such as RSS or Atom feeds, of data. System architecture includes one or more social networking services. Social networking services may enable users to create personal profiles describing their personal and/or professional interests. Users may use the social networking services to specify relationships between their profiles and profiles of other users, who may be friends, colleagues, or have other types of social relationships with users. Social networking services often allow its users to share ideas, content or media, events, or other information with other users in their personal social network, as defined within the social networking service. To this end, social networking services may include messaging and communications functions, functions for hosting and sharing images, video and animation, electronic documents, hyperlinks, and interactive content. Social networking services may also include application programming interfaces for enabling external applications and services access to user profiles and associated content. Social networking service application programming interfaces may be implemented using web services protocols, including stateful and stateless protocols, such as REST, SOAP, and XML-RPC.

Embodiments of the invention may be implemented externally to one or more social networking services or may be integrated within a social networking service.

An electronic communication network enables communication between computers, web server, application server, database server, and/or any other entities in the system architecture. In an embodiment, the network may further include any form of electrical or optical communication devices, including wireless and wired networks. The network may also incorporate one or more local-area networks, such as an Ethernet network; wide-area networks, such as the Internet and cellular carrier data networks; and virtual networks, such as a virtual private network.

The system architecture is one example for executing data applications according to an embodiment of the invention. In another embodiment, application server, web server, and/or database can be combined into a single server computer application and system. In alternate embodiment, all or a portion of the web server and application functions may be integrated into an application running on each of the user computers. For example, a JavaScript application on the user computer may be used to retrieve or analyze data and display portions of the applications.

Figure 2:
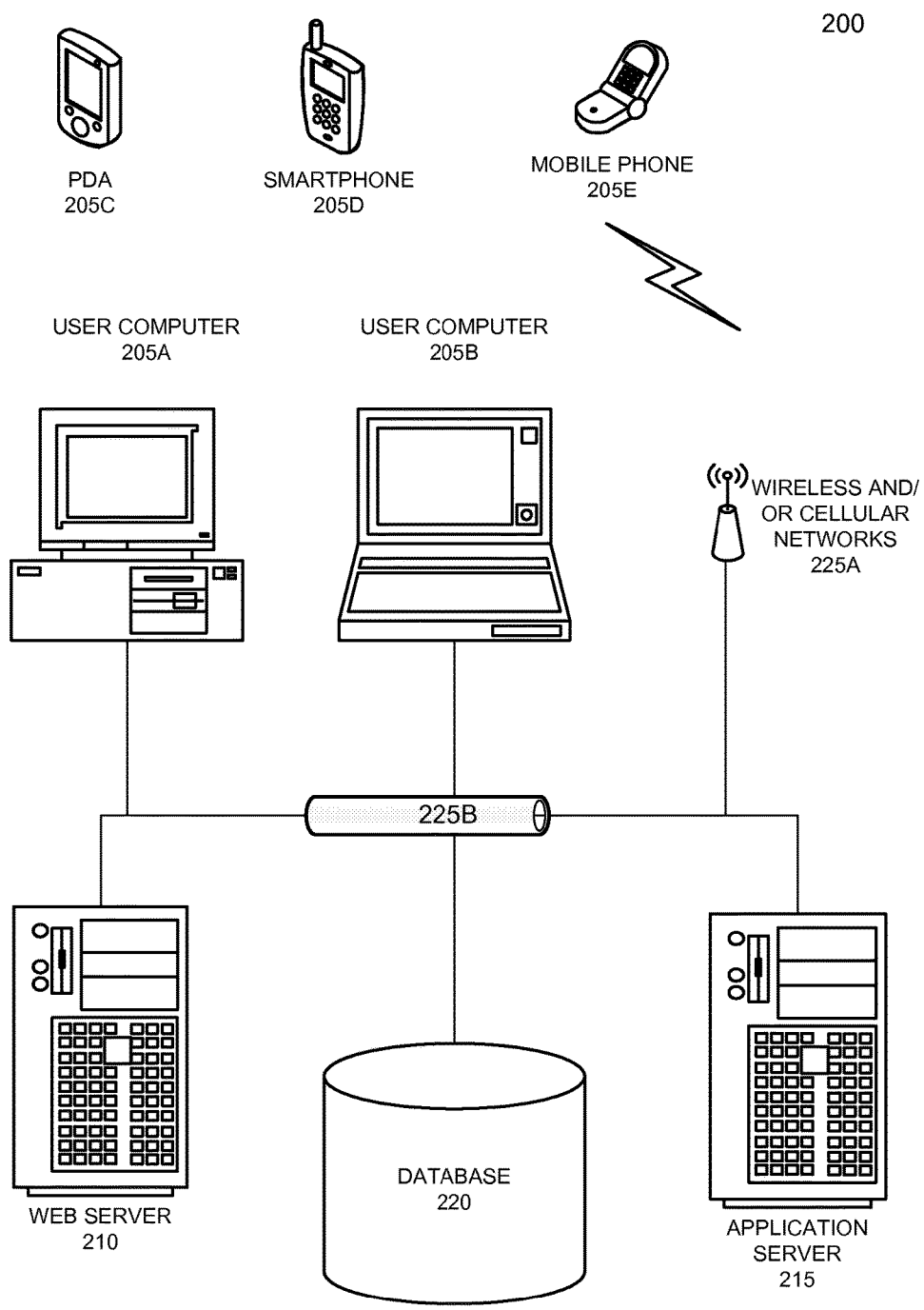
FIG. 2 illustrates a computer system suitable for implementing all or a portion of embodiments of the invention.

FIG. 2 illustrates an example system architecture 200 suitable for implementing an embodiment of the invention. The system includes user computers 205 including portable 205a and desktop personal computers 205b, personal digital assistants 205c, smartphones 205d, and mobile phones 205e. The system can interface with any type of electronic device, such as a thin-client computer, Internet-enabled mobile telephone, mobile Internet access device, electronic book, or personal digital assistant, capable of displaying and navigating web pages or other types of electronic documents. Although system is shown with five user computers, any number of user computers can be supported.

A web server 210 is used to process requests from web browsers and standalone applications for web pages, electronic documents, social media networking service content, and other data from the user computers. The web server 210 may also provide syndicated content, such as RSS or Atom feeds, of data related to service requests, service providers, bids, and consumer feedback.

Application server 215 operates one or more data applications. The data applications can be implemented as one or more scripts or programs written in any programming language, such as Java, C, C++, C#, or any scripting language, such as JavaScript or ECMAScript, Perl, PHP, Python, Ruby, or TCL. Data applications can be built using libraries or application frameworks, such as Rails or .NET.

The data applications on application server 215 process input data and user computer requests and can store or retrieve data from database 220. Database 220 stores data created and used by the data applications. In an embodiment, the database 220 is a relational database, such as MySQL, that is adapted to store, update, and retrieve data in response to SQL format commands.

In an embodiment, the application server 215 is one or more general purpose computers capable of executing programs or scripts. In an embodiment, the web server 210 is implemented as an application running on one or more general purpose computers. The web server and application server may be combined and executed on the same computers.

An electronic communication network 225 enables communication between user computers 205, web server 210, application server 215, and database 220. In an embodiment, network 225 may further include any form of electrical or optical communication devices, including wireless 225a and wired 225b networks. Network 225 may also incorporate one or more local-area networks, such as an Ethernet network; wide-area networks, such as the Internet and cellular carrier data networks; and virtual networks, such as a virtual private network.

The system is one example for executing data applications according to an embodiment of the invention. In another embodiment, application server, web server, and optionally database can be combined into a single server computer application and system. In alternate embodiment, all or a portion of the web server and application functions may be integrated into an application running on each of the user computers. For example, a JavaScript application on the user computer may be used to retrieve or analyze data and display portions of the applications.

Further embodiments can be envisioned to one of ordinary skill in the art. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of soliciting feedback of a digital good, the method comprising:
   generating, by a plurality of client application components that interface with a plurality of client applications when the plurality of client application components are executed on a plurality of digital devices, a plurality of electronic communications having data indicative of user activity information for a set of users of a digital good stored in non-volatile memory in each of the plurality of digital devices associated with the set of users, and wherein the user activity information includes a plurality of categories of user activity data indicative of a plurality of different types of uses of the digital good by the set of users within the client applications;
   receiving, at a network interface of a server computer, the plurality of electronic communications, wherein the plurality of electronic communications are sent over a communications network by the client application components to the interface of the server computer;
   identifying, by a user analyzer executed by a processor of the server computer, at least one user as an enthusiast user of the digital good included in the set of users based on a presence of at least one type of activity within the data indicative of user activity information, wherein identifying the at least one user as the enthusiast further comprises comparing user activity information of the at least one user with user activity information from a set of users, and when the user activity information of the at least one user exceeds a threshold relative to the user activity information from the set of users, identifying the at least one user as the enthusiast user;
   generating, by a user feedback handler executed by the processor of the server computer, a review solicitation for the identified enthusiast user;
   transmitting, using the network interface of the server computer, the generated review solicitation over the communications network to a client application component that interfaces with a client application providing access to the digital good executing on a digital device associated with the identified enthusiast user;
   generating, by the client application component on the digital device associated with the identified enthusiast user, a prompt;
   detecting the enthusiast user invoking a particular feature of the client application;
   configuring a graphical user interface by the client application to display the prompt;
   displaying the prompt with the graphical user interface by the client application on the digital device in response to the detection of the enthusiast user invoking the particular feature;
   obtaining a review for the digital good from the enthusiast user from the graphical user interface, wherein one or more characteristics of the graphical user interface comprising a visual and interaction style of the graphical user interface are configured by the client application when displaying the generated review solicitation within the client application; and
   receiving, with the network interface of the server computer from the client component, the user review of the identified enthusiast user.

2. The method of claim 1, wherein the user activity information includes external actions indicative of appreciation of the digital good.

3. The method of claim 1, wherein identifying the at least one enthusiast user comprises:
   identifying the at least one enthusiast user based on presence or absence of one or more types of user activity data.

4. The method of claim 1, further comprising communicating the user review to a digital goods marketing provider.

5. The method of claim 1, wherein identifying the at least one user as the enthusiast user further comprises determining from the data indicative of user activity information that the at least one user shared the digital good with another user using a social networking service.

6. A system for soliciting feedback of a digital good, the system comprising:
   a plurality of client application components that interface with a plurality of client applications when the plurality of client application components are executing on a plurality of digital devices, wherein the plurality of client components generate a plurality of electronic communications having data indicative of user activity information for a set of users of a digital good stored in non-volatile memory in each of the plurality of digital devices associated with the set of users, and wherein the user activity information includes a plurality of categories of user activity data indicative of a plurality of different types of uses of the digital good by the set of users within the client applications; and
   a server computer comprising:
   a network interface that communicatively couples the server computer with the plurality of client application components;
   a memory; and
   a processor coupled with the network interface and the memory to:
      receive, with the network interface, the plurality of electronic communications, wherein the plurality of electronic communications are communications sent over a communications network by the client application components to the interface of the server computer;
      identify, with a user analyzer executed by the processor, at least one user as an enthusiast user of the digital good included in the set of users based on a presence of at least one type of activity within the data indicative of user activity information, wherein identifying the at least one user as the enthusiast user includes the processor to compare user activity information of the at least one user with user activity information from a set of users, and when the user activity information of the at least one user exceeds a threshold relative to the user activity information from the set of users, the processor to identify the at least one user as the enthusiast user,
      generate, with a user feedback handler executed by the processor, a review solicitation for the identified enthusiast user,
      transmit, using the network interface, the generated review solicitation over a network to a client application component that interfaces with a client application providing access to the digital good executing on a digital device associated with the identified enthusiast user, the client application component in response to receipt of the generated review solicitation, generates a prompt that displays a graphical user interface and obtains a review for the digital good, wherein the client application configures the graphical user interface to display the prompt in response to detection of the enthusiast user invoking a particular feature of the client application, and wherein one or more characteristics of the graphical user interface comprising a visual and interaction style of the graphical user interface are configured by the client application when displaying the generated review solicitation within the client application, and
      receive, with the network interface of the server computer from the client component, the user review of the identified enthusiast user.

7. The system of claim 6, wherein the user activity information includes external actions indicative of appreciation of the digital good.

8. The system of claim 6, wherein the processor to identify the at least one enthusiast user comprises the processor to:
   identify the at least one enthusiast user based on presence or absence of one or more types of user activity data.

9. The system of claim 6, further comprising the processor to communicate the user review to a digital goods marketing provider.

10. The system of claim 6, wherein identifying the at least one user as the enthusiast user includes the processor to determine from the data indicative of user activity information that the at least one user shared the digital good with another user using a social networking service.

* * * * *